D. H. Thayer
Harvester.
No. 76001 — Patented Mar. 24, 1868
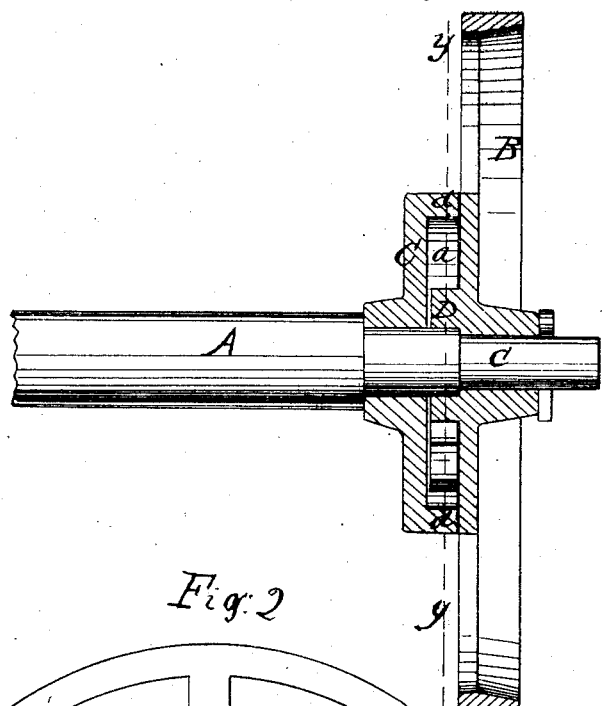
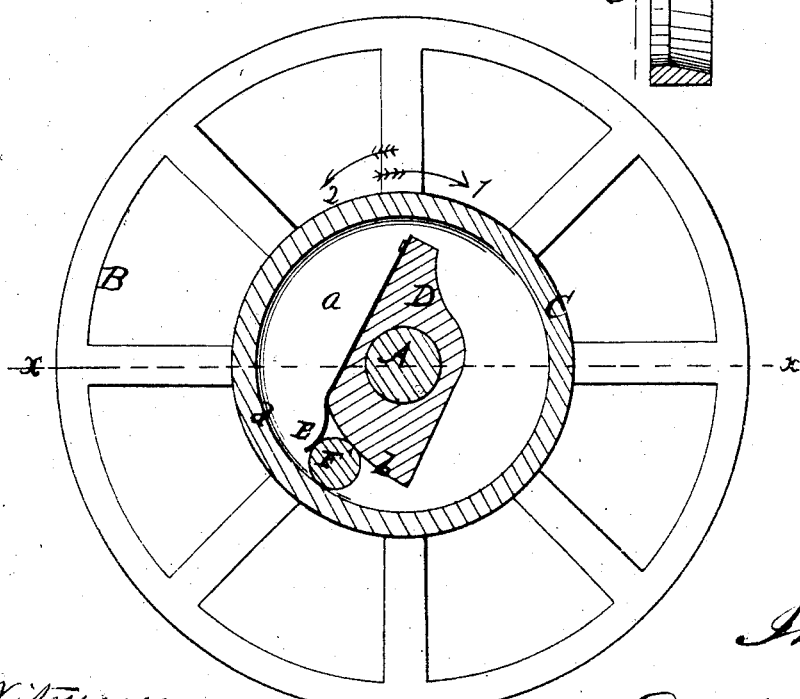
Witness
Theo Tusche
Alfred R. Egerton
Inventor
D. H. Thayer
Per Munn & Co.
Attys.

UNITED STATES PATENT OFFICE.

D. H. THAYER, OF LUDLOWVILLE, NEW YORK.

IMPROVEMENT IN HARVESTERS.

Specification forming part of Letters Patent No. 76,001, dated March 24, 1868.

*To all whom it may concern:*

Be it known that I, D. H. THAYER, of Ludlowville, in the county of Tompkins and State of New York, have invented a new and useful Improvement in Grain and Grass Harvesters; and that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim and desire to have secured to me by Letters Patent.

This invention relates to a new and improved means employed for forming a connection between the wheels of a grain and grass harvester and their axle.

The invention is designed as an improvement over the ordinary pawl and ratchet now generally used to cause the wheels to turn the axle, and answers as a shaft to drive the sickle when the machine is drawn forward, and admit of the wheels turning loosely independently of the axle when the machine is backed, so that the sickle will be inoperative under a retrograde movement of the machine.

In the accompanying sheet of drawings, Figure 1 is a section of my invention, taken in the line $x\, x$, Fig. 2; Fig. 2, a section of the same, taken in the line $y\, y$, Fig. 1.

Similar letters of reference indicate like parts.

A represents the axle of a grain and grass harvester, and B one of the wheels, fitted loosely thereon. On the axle A, near each end thereof, there is firmly keyed a circular disk, C, the outer faces of which are sunken, to form circular chambers $a$, to receive a plate, D, on the inner side of each wheel B, one edge, $b$, of these plates being curved eccentric with the disks C, as shown clearly in Fig. 2. The arms $c$ of the axle pass loosely through these plates, and the latter have each a spring, E, attached, and these springs project beyond the eccentric-curved edges $b$ of the plates, in order to hold in position rollers F, which are between the curved edges $b$ and the rims $d$, which form the edges of the chambers $a$ in the outer sides of the disks C.

It will be seen from the above description that, as the machine is drawn forward and the wheels B rotate in the direction indicated by the arrow 1, the rollers F will bind between the curved edges $b$ of the plates and the rims $d$ of the chambers $a$, and cause the wheels B to turn the axle A, and consequently drive or operate the sickle; and it will further be seen that when the machine is backed and the wheels B turned in the opposite direction, as indicated by arrow 2, the rollers F will become loose, or will not bind between the curved edges $b$ of the plates D and the rims $d$ of the chambers $a$, the springs E retaining them in place. In backing the machine, therefore, the wheels B B will turn loosely on their axle A.

By this simple means the wheels B are instantly connected with their axle when a forward movement of the machine commences, and are also instantly released or loosened from the axle when a retrograde movement of the machine commences. There is no lost motion, nor any unnecessary movement of the sickle, and the device is durable, and far more preferable and desirable than the usual pawl-and-ratchet mechanism.

Having thus described my invention, I claim as new and desire to secure by Letters Patent—

The plates D on the wheels B, provided with curved eccentric edges $b$ and springs E, in combination with the chambered disks C, secured permanently on the axle A, and the rollers F, placed in the chambers, between the curved edges $b$ of the plates and the rims or edges $d$ of the chambers $a$, substantially as and for the purpose set forth.

D. H. THAYER.

Witnesses:
HENRY B. LABAU,
EDWARD L. MITCHELL.